United States Patent [19]
Strauff

[11] 3,884,319
[45] May 20, 1975

[54] HYDRAULIC SERVO-STEERING SYSTEM

[75] Inventor: Gunter Strauff, Hanauerwag, Germany

[73] Assignee: Langen & Co., Dusseldorf, Germany

[22] Filed: Dec. 18, 1972

[21] Appl. No.: 316,398

[30] Foreign Application Priority Data
Dec. 16, 1971 Germany.......................... 2162385

[52] U.S. Cl. .............................. 180/79.2 R; 91/465
[51] Int. Cl. ................................................ B62d 5/08
[58] Field of Search .......... 180/79.2 R; 91/442, 465

[56] References Cited
UNITED STATES PATENTS

| | | | |
|---|---|---|---|
| 2,053,301 | 9/1936 | Russell | 91/465 X |
| 2,058,377 | 10/1936 | Francis | 91/442 X |
| 2,474,681 | 6/1949 | Lane | 91/442 X |
| 2,784,600 | 3/1957 | Hammond | 91/465 X |
| 2,816,420 | 12/1957 | Walsh | 91/442 X |

*Primary Examiner*—Robert J. Spar
*Assistant Examiner*—Leslie J. Paperner
*Attorney, Agent, or Firm*—Holman & Stern

[57] ABSTRACT

A hydraulic servo-assisted steering system for vehicles having steerable wheels and a steering wheel, including a pressure source, a reservoir, a transmission consisting of at least two parts interposed between the steering wheel and the steerable wheels, a servo-motor which assists steering and acts on any convenient point of that part of the transmission which is remote from the steering wheel, a control valve which reacts to small relative movements between the two parts of the transmission, the control valve depending on the direction of relative movement connecting a working chamber of the servo-motor either to the pressure source or the reservoir, and a pressure converter located in a connection to the pressure source and not the working space which is controlled by the control valve.

11 Claims, 3 Drawing Figures

HYDRAULIC SERVO-STEERING SYSTEM

BACKGROUND OF THE INVENTION

The present invention relates to a hydraulic servo-assisted steering system comprising a pressure source; a reservoir; a transmission consisting of at least two parts interposed between a steering wheel and the wheels steered thereby; a servo-motor which assists steering and acts on any convenient part of the transmission which is remote from the steering wheel, and a control valve which reacts to small relative movements between the two parts of the transmission, with the control valve connecting a working chamber of the servo according to the hand of the relative movement either to the pressure source or the reservoir.

PRIOR ART

A servo-assisted steering system of such a type has been described in French Pat. No. 1,364,591. The servo-motor has the form of a differential cylinder containing a piston at the end of a projection from one end of the cylinder. The piston rod annular working space on the side of the smaller effective piston cross section is always connected with the pressure source. The other working space is connected by the control valve either with the pressure source or with the reservoir. As is well understood, this arrangement has several advantages, of which the primary advantage is that the piston of the servo-motor is always hydraulically locked. Another advantage is the possibility the system affords in making use of a three-way piston valve that is relatively easy to produce and adjust, having what is known as two control edges. On the other hand, such an arrangement, however, will not function satisfactorily unless the effective cross section is a ratio of 2:1. The desirable result of this is that the average pressure difference between the pressure source and the controlled working space is exactly the same as the average pressure difference between the controlled working space and the reservoir. In other words, forces of the same magnitude are produced when steering to the right or to the left. If the ratio of the effective cross sections were 1.5:1, then a servo-assisted steering system of the above-mentioned type would still be functional, but it would be functionally asymmetrical. If the ratio of the effective cross sections is, however, 1:1, as in servo-cylinders containing a through piston rod, then the arrangement cannot function since the pressure in the working space controlled by the control valve can never be higher than the pressure existing in the uncontrolled working space. Hence, all conventional servo-assisted steerings in which the ratio is 1:1 must be equipped with steering valves having four control edges, an arrangement which involves several drawbacks.

OBJECTS AND SUMMARY OF THE INVENTION

It is therefore the object of the instant invention to provide in a hydraulic servo-assisted steering system, an element which changes the pressure in the connection between the pressure source and that working space of the servo-motor which is not controlled by the control valve.

The present invention thus enables a steering system to be provided in which the same steering torque may be generated in either direction of lock regardless of the ratio of the effective cross sections. Use may be made of two-edge control and a 1:1 ratio of the effective servo-motor cross sections can nevertheless provide a fully functional system. The advantages of two-edge control can thereby be retained, while the additional cost is small. Moreover, the present invention can, in a conventional fashion, allow manual steering in the event of a malfunction of the servo system.

The above-mentioned element which changes the pressure may be a proportional pressure valve which opens a connection between the non-controlled working space of the servo-motor and the reservoir when the pressure ratio falls below a given level and establishes communication between the pressure source and said working space when a given pressure ratio is exceeded. The pressure changing element may, however, also be in the form of a pressure-regulating valve having a transfer opening or port, or in the form of a pressure-reducing valve with a transfer opening or port. The modified pressure will generally be $$p_2 = p \cdot p_1 . F_1/p \cdot F_2$$

in which $p$ represents the pressure of the pressure source; $p_1$ represents the pressure in the working space controlled by the control valve; $F_1$ is the associated effective cross section of the servo-motor on which the modified pressure acts, always provided the control valve is in a central position and no outside forces arise. Since, for the above stated reasons, it is desirable for $$p_1 : p = 1:2$$

the formula in such a case simply becomes $$p_2 = p \cdot F_1 /2F_2$$

or in the event of $F_1 = F_2$, $$p_2 = p/2$$

In a proportional pressure valve, a modified pressure will be obtained if the valve piston is $p_2$, a stepped diameter piston having effective cross section $f$ and $f_2$ which are inversely proportional to the associated pressures, namely $$f_2 : f = p : p_2$$

or $$f_2 : f = p : F_2/p_1 \cdot F_1$$

In the event of $p_1 = p_2$ and $F_2 = F_1$, the result is $f_2 : f = 2:1$.

If reaction members are present having effective cross sections $\phi_1$ and $\phi_2$ associated with the respective working spaces, and their reactive thrusts act on lever arms $a_1$ and $a_2$ in such manner that $$p_1 \cdot \phi_1 \cdot a_1 = p_2 \cdot \phi_2 \cdot a_2$$

then $$\phi_2/\phi_1 = p_1/p_2 \cdot a_1/a_2 = F_2/F_1 \cdot a_1/a_2$$

In the case of equal lever arms $a_1 = a_2$ and equal cross sections $F_1 = F_2$, then the effective cross sections of reaction members must likewise be equal, viz $$\phi_1 = \phi_2$$

A further possibility consists in applying the pressure existing in the controlled working space to one reaction member, while the pressure of the pressure-source to the other. A balance will then be obtained if $$p_1 \cdot \phi_1 \cdot a_1 = p \cdot \phi \cdot a$$

or if $$\phi/\phi_1 = p_1 \, a_1/p \, a_2$$

In the event of $a_1 = a_2$ and $p_1 = p/2$ one obtains $$\phi_1 = 2\phi$$

It should be emphasized that all the formulas provide only theoretical values. In practice, minor deviations are quite possible. For example, among other parameters which have an effect are functional forces, hydrodynamic drag, resultant pressure drops, manufacturing tolerances or asymmetrical steering-kinematics. It is, however, within the descretion of the designer to make allowance for these by suitable corrections. To increase safety, it may be desirable to provide a one-way or check valve in a line bypassing the pressure changing element with such valve preventing flow through the bypass into the working space of the servo-motor. The invention is explained in more detail by means of an embodiment which is in part diagrammatically illustrated, in which

DETAILED DESCRIPTION OF THE INVENTION

Figure 1:
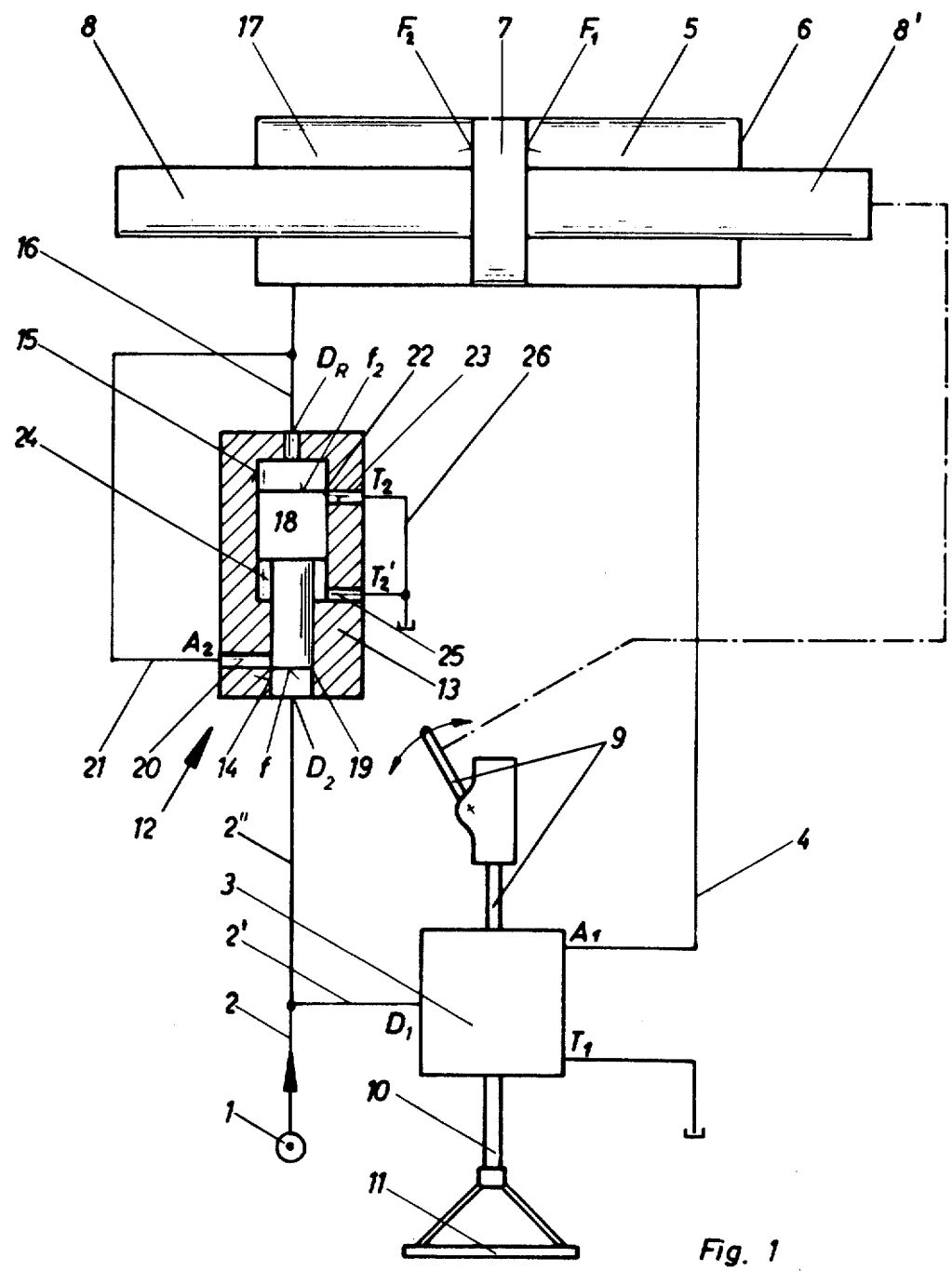
FIG. 1 is a circuit diagram for a servo-steering mechanism.

As shown in FIG. 1, a pressure pipe or line 2 leads from a pressure source 1 (not illustrated in detail) and branches into pressure pipes or lines 2' and 2''. The pressure pipe 2' leads to inlet connection $D_1$ of a three-way control valve 3, which is provided with two outlet connections $A_1$ and $T_1$. A pipe or line 4 leads from connection $A_1$ to a working space 5 of a cylinder 6 slidably containing piston 7 provided with a piston rod 8, 8' projecting from both ends of the cylinder. The piston rod 8, 8' is operably connected as indicated by dot-dash lines with a part 9 of a multi-part torque transmission means. A second part 10 of such transmission means is connected with a steering wheel 11. The control valve 3 is operated by means of relative movements between the parts 9 and 10. The part 9 is suitably connected with the wheels to be steered (not illustrated).

The pressure pipe 2'' leads to a connection $D_2$ of a proportional pressure valve 12 having a valve casing 13. A bore 14 leads from connection $D_2$ to the interior of casing 13, and communicates with a bore 15 of a larger diameter. A connection $D_R$ is connected to the bore 15. A pipe 16 leads from connection $D_R$ to a second working space or chamber 17 of the cylinder 6. A stepped diameter piston 18 is slidable in the bores 14 and 15, and the piston 18 controls a transverse port 20 in the casing by means of a control edge 19 formed by one end face $f$. The transverse port 20 leads to a connection $A_2$. A pipe 21 is connected to connection $A_2$ and communicates with the pipe 16. The other end face $f_2$ of the stepped piston provides a control edge 22, which controls a second transverse port 23 connected with a connection $T_2$. A further connection $T'_2$ is in communication with an annular space 24, which is defined between bore 15 and differential piston 18, by means of a transverse port 25. The connections $T_2$ and $T'_2$ are connected with a drain or return pipe 26.

The effective faces of the piston 7 are indicated $F_1$ and $F_2$ and are of equal size. The ratio of the effective end faces $f_2$ and $f$ of the piston 18 is 2:1.

The three-way control valve 3 (FIG. 2) is provided with a casing in the form of a rotary-distributor in which is positioned a valve body 27 connected with the part 9 of the transmission. A bore 28 is located in the valve body 27, and the part 10 extends into the bore 28. A slit-shaped recess 29 adjoins the bore 28 and provides accommodation for a lever 30 fixedly connected with the part 10. Two axially aligning transverse bores 31 and 32 communicate with the slit-shaped recess 29.

A control piston 33 is slidingly arranged in the bore 31, and such control piston is displaced by the lever 30 via an intermediate tappet 34. A reaction piston 35 is slidable in the bore 32 and is operated by lever 30 via an intermediate tappet 36. The control piston 33 is provided, at approximately its center at each end of a shoulder or land 37, with two control edges 38 and 39. In the center position, the shoulder 37 blocks an annular slot or groove 40 which communicates with the connection $A_1$. The control edge 38 controls a cross section of flow between the annular slot 40 and an annular groove or slot 41 in the control piston 33 which communicates with the connection $D_1$ as well as with a front reaction space or chamber 42 of the control piston 33. The control edge 39, however, controls a cross section of flow from the annular groove 40 to an annular slot or groove 43 in the control piston 33, which is connected to the connection $A_1$.

A reaction space or chamber 44 behind the reaction piston 35 is continuously connected with the connection member $A_1$. For a better understanding, the channels leading to the connections $p_1$, $A_1$ and $T_1$ are indicated by the same reference numerals. The effective reaction faces are indicated by $\phi_1$ for the reaction piston 35 and $\phi$ for the control piston 33.

Under the assumption that $F_1 = F_2$ and accordingly $f2 = 2f$, a pressure $p$ in the pipes 2, 2' and 2'' would be reduced to a pressure $p_1 = p_2$ in the system denoted by components 16, 17, 20 and 21. The reduction is maintained via the control edge 19. The control edge 22 closes the transverse port 23 with the port being just covered or there may be some positive overlap. As long as the steering wheel 11 is not moved, the pressure will also be $p_1$ in space 5, and the piston 7 will be in hydraulic equilibrium in its existing position. However, as soon as the steering wheel 1 is turned, for example, in a counterclockwise direction, the control piston 33 is displaced via part 10, lever 30 and tappet 34 and control edge 39 will open the connection between $A_1$ and $T_1$. The result is a pressure reduction in the system defined by components 5, 4, $A_1$, 40, 44, whereby the piston 7 is moved to the right. Simultaneously, the steering is given a feel because the equilibrium of moments established by the reaction faces $\phi$ and $\phi_1$ is upset. The force $p, \phi$ exceeds the force $p_1 : {}_1$, assuming that force $p_1 : \phi$ = 2:1.

During rotation of the steering wheel in the clockwise direction, the lever 30 is deflected so that the control piston 33 is maintained in contact with lever 30 which, by means of force $\phi \cdot p_1$, establishes communication between $D_1$ and $A_1$ via the shift of the control edge 38.

The result is a pressure increase in the system defined by components 5, 4, $A_1$, 40, 44. The piston 7 shifts to the left. At the same time, the force $p_1 \cdot 1$ becomes greater than the force $p \cdot \phi$, whereby a reaction moment is produced and again gives the required feel to the steering. The pressure fluid, which displaces by its movement to the left the piston 7, flows via the pipe 16, connection $D_R$ and bore 15, a cross section of flow opened by control edge 22 and transverse port 23 to the connection $T_2$ and from there into the drain pipe 26.

During this process, the pressure $p_1$ remains substantially the same since the proportional pressure valve 12 does not contain a biasing spring but motion is controlled entirely by reference to the pressure. By matching the ratio of the end faces $f$ and $f_2$ to that of the faces $F_1$ and $F_2$ the mean pressure differences between the connections $D_1$ and $A_1$ on the one hand and between $A_1$ and $T_1$ on the other hand can be kept equal.

Figure 2:
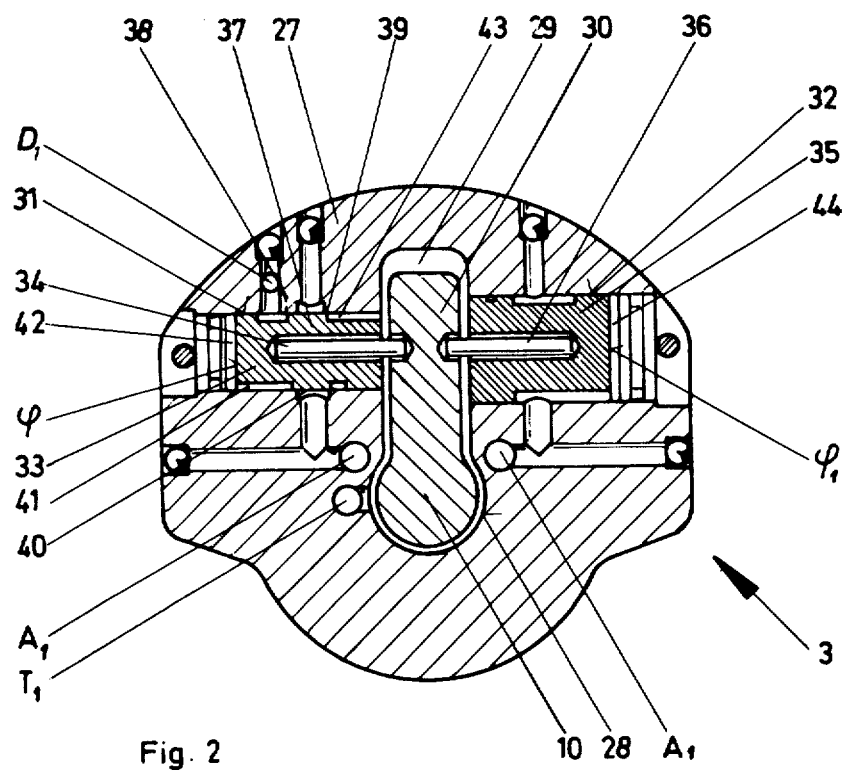
FIG. 2 is a sectional view of an embodimment of a three-way control valve with hydraulic reaction spaces.
Figure 3:
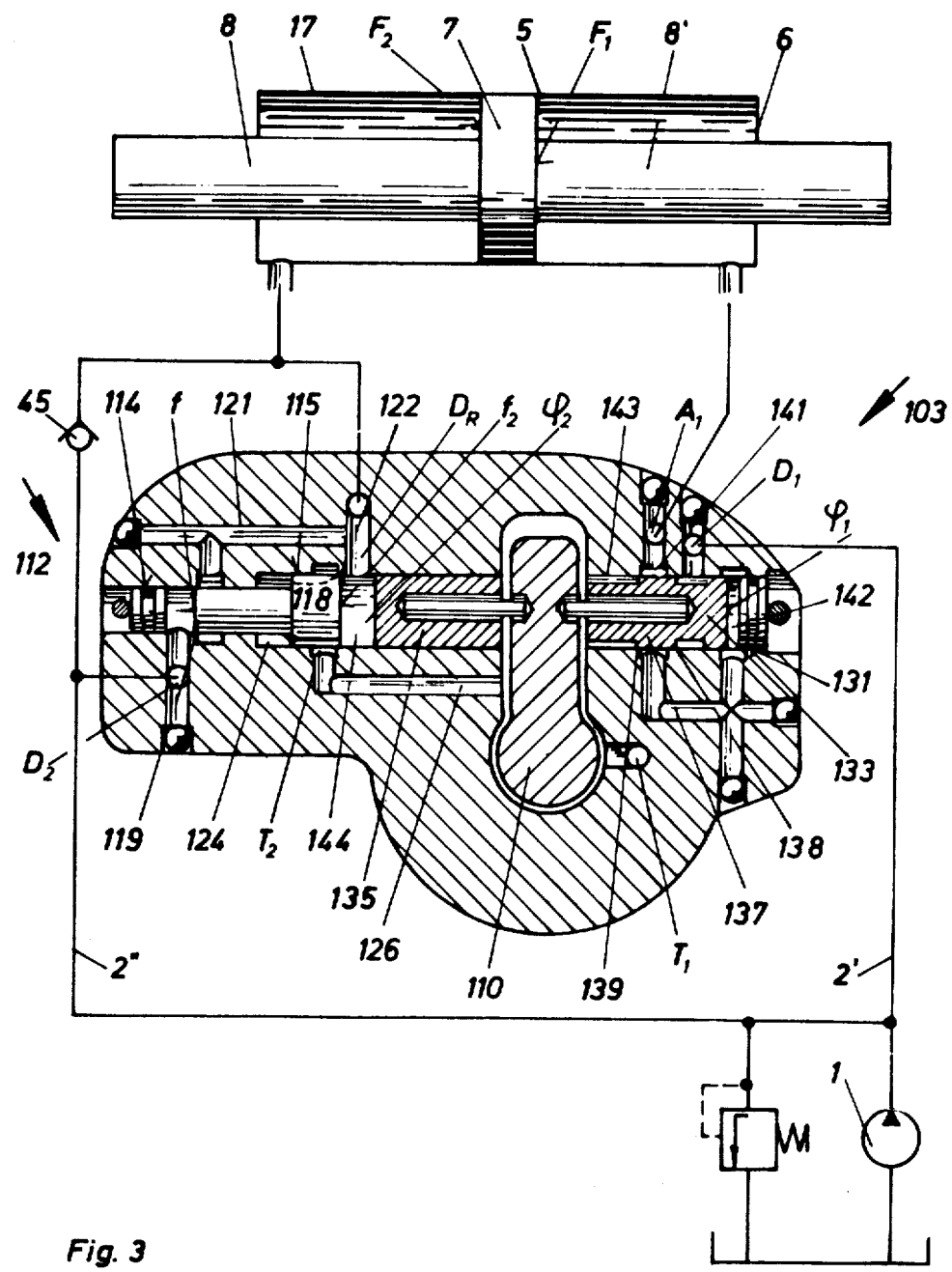
FIG. 3 is a view in cross section of a three-way control valve and a pressure-ratio valve in an arrangement inside a casing.

FIG. 3 shows a compact combination unit containing a three-way control valve and a pressure-reducing valve. Parts, which in their functions correspond to parts of FIGS. 1 and 2, are indicated by the same reference numerals which are higher by 100. Connections, effective working faces and other functionally equivalent parts are indicated by the same reference numerals or reference symbols. A substantial difference between this arrangement and that of FIG. 2 consists primarily in that the control piston 133 and reaction piston 135 have end faces of the same effective area $\phi_1 = \phi_2$. Accordingly, the face $\phi_1$ is now the effective cross section of the control piston 133 and is subject to the pressure existing in working space 5, while face $\phi_2$ forming the effective cross section of the reaction piston 135 is subject to the pressure existing in working space 17.

The stepped piston 118 is positioned coaxially with the reaction piston 135, whereby the effective end faces $f_2$ and $\phi_2$ face each other and are equal. They delimit the reaction space 144. The functions are analogous to those mentioned above in connection with FIGS. 1 and 2 so that no further detailed explanation is required. A one-way valve 45 works in a pipe by passing the proportional pressure valve, i.e., said bypass connecting the pipes 2'' and 121 and the valve closing in the direction of working space 17.

As above described, it is naturally possible to form the areas of the faces $F_1$ and $F_2$ to be different. Assuming that the ratio of the two faces is 2:1 or more, the utilization of conventional circuitry would be simpler. The present invention is not to be limited by the represented embodiment. Thus, in a hydraulic system are known a plurality of pressure-reducing valves. It is also easily possible to utilize other prior art construction forms for the control valve. The control valve may, for example, be constructed without reaction spaces, if the reaction is obtained by means of a dual-effective reaction member or by two individually effective reaction members. It is furthermore possible to utilize a control piston with two reaction spaces and to arrange the pressure converter coaxially thereto. The manner of activation of the control valve plays only a subordinate role and is known in prior art in a great variation of forms. It should be emphasized that this invention is not limited to certain constructions of activations of control valves. Thus, for example, it is easy to realize also so-called block steerings.

What is claimed is:

1. A hydraulic servo-assisted steering system for vehicles having steerable road wheels and a steering wheel comprising: a pressure source; a reservoir; a transmission including at least two parts interposed between the steering wheel and the steerable road wheels; a servo-motor which assists steering and acts on any convenient point of that part of the transmission which is remote from the steering wheel,; and a control valve which responds to small relative movements between said two parts of the transmission; the control valve according to the hand of said relative movement connecting a working space of the servo-motor either with the pressure source or with the reservoir; the improvement including a pressure changing means located in a connection between the pressure source and that working space of the servo-motor which is not controlled by the control valve.

2. The hydraulic servo-assisted steering system as claimed in claim 1, in which the pressure changing means comprises a proportional pressure valve which opens a connection between the working space and a drain pipe when the pressure ratio $p/p_2$ falls below a given level and which connects the pressure source with the working space when a given pressure ratio $p/p_2$ is exceeded.

3. The hydraulic servo-assisted steering system as claimed in claim 1, in which the pressure changing means comprises a pressure-regulating valve provided with transfer opening or a pressure-reducing valve with a transfer opening.

4. The hydraulic servo-assisted steering system as claimed in claim 2 in which the modified pressure $p_2$ is determined according to the following formula:

$$p_2 = p \cdot p_1/p \cdot F_1/F_2$$

in which $p$ is the pressure of the pressure source, $p_1$ is the pressure in the working space controlled by the control valve, $F_1$ is the associated effective cross section of the servo-motor and $F_2$ is the effective cross section of the servo-motor to which the modified pressure is applied, assuming the control valve is located in a central position in which all connections are cut off, and that external forces are absent.

5. The hydraulic servo-assisted steering system as claimed in claim 2, in which the proportional pressure valve is provided with a stepped diameter piston in which the effective cross section loaded by the pressure of the pressure source and the cross section loaded by reduced pressure are inversely proportional to the pressures acting on the cross sections.

6. The hydraulic servo-assisted steering system as claimed in claim 5, in which the effective cross sections of the stepped diameter piston are the areas of its end faces.

7. The hydraulic servo-assisted steering system as claimed in claim 6, in which the one of the effective cross sections is delimited by a control edge which controls the connection between the pressure source and the working space while the other effective cross section defines a control edge which controls the connection between the working space and the drain pipe.

8. The hydraulic servo-assisted steering system as claimed in claim 1, in which the pressure changing means is by-passed by a one-way valve preventing flow into the working space of the servo-motor.

9. The hydraulic servo-assisted steering system as claimed in claim 1 including hydraulically loaded reaction members each connected to one of the working spaces in which the products of the effective cross sections with their associated lever arms are inversely proportional to the associated pressures in the working spaces.

10. The hydraulic servo-assisted steering system as claimed in claim 1, including hydraulically loaded reaction members in which the pressure of the pressure source is applied to the effective cross section of one reaction member while the effective cross section of the other reaction member is exposed to the pressure in the controlled working space of the servo-motor, the products of the effective cross sections and their associated lever arms being inversely proportional to the effective pressures.

11. The hydraulic servo-assisted steering system as claimed in claim 9 in which the control valve and the pressure changing means are contained in a common body, the reaction member not associated with the non-controlled working space being disposed in axial alignment with the pressure changing means and the cross sections which are exposed to the modified pressure facing each other and being equal.

* * * * *